(12) United States Patent
Grebovic et al.

(10) Patent No.: US 11,595,526 B2
(45) Date of Patent: Feb. 28, 2023

(54) SYSTEMS AND METHODS OF CONTACT CENTER CLIENT ASSIGNMENT LEVERAGING QUANTUM COMPUTATION

(71) Applicant: Avaya Management L.P., Durham, NC (US)

(72) Inventors: Dragan Grebovic, Amesbury, MA (US); David Chavez, Broomfield, CO (US); John Young, Buntingford (GB)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/668,963

(22) Filed: Feb. 10, 2022

(65) Prior Publication Data

US 2022/0263946 A1 Aug. 18, 2022

Related U.S. Application Data

(60) Provisional application No. 63/149,980, filed on Feb. 16, 2021.

(51) Int. Cl.
*H04M 3/523* (2006.01)
*H04M 3/51* (2006.01)

(52) U.S. Cl.
CPC .............................. *H04M 3/5233* (2013.01)

(58) Field of Classification Search
None
See application file for complete search history.

(56) References Cited

U.S. PATENT DOCUMENTS

2021/0176360 A1* 6/2021 Kadakia .............. H04M 3/5237
2021/0360106 A1* 11/2021 Matula ................. H04M 3/527

* cited by examiner

*Primary Examiner* — Harry S Hong
(74) *Attorney, Agent, or Firm* — Sheridan Ross P.C.

(57) ABSTRACT

A contact center, system, and method of operating a contact center are provided. In one example, the system includes a quantum computing resource and a server. The server is configured to receive a contact from a customer communication device, provide information about the contact to the quantum computing resource, receive a probabilistic output from the quantum computing resource based on the quantum computing resource processing the information about the contact, and make a work assignment decision for the contact based on the probabilistic output.

20 Claims, 8 Drawing Sheets

Contact Center Agent Application — □X

Agent A,

Your upcoming call is with Diana (90 % likelihood)

- Expected language: English (82 % likelihood) or Spanish (16 % likelihood)
- Expected issue: Internet connection slow (30 % likelihood) or Billing question (22 % likelihood)
- Expected question(s): [Click on each question for more suggested answers]

"*Why is my Internet slow?*"
  Recommended Answer: Have you tried resetting your router?

"*Why was I charged an extra $ 5 on my last bill?*"
  Recommended Answer: I see you exceeded your monthly quota for data, would you like to increase your data plan for next month?

Use this link to access a knowledge base to provide additional information to the caller based upon their anticipated questions.

- Expected call length: 5 minutes 20 seconds

Contact Center Agent Application — □X

Agent A,

Please provide feedback:

Your current call is with Diana [YES] [NO]

- Diana's Language: [ ] English; [ ] Spanish; [ ] Other: [fill in blank]
- Issue: [ ] Internet connection slow; [ ] Billing question; [ ] Other: [fill in blank]
- Question(s): [ ] "Why is my Internet slow?"
  [ ] "Why was I charged an extra $5 on my last bill?"

Contact Center Communication Message Application — 248

Hello Caller Diana,

Thank you for calling the XYZ Contact Center

We are working to connect you with the most optimal agent for your issues. Agent A should be available in 45 seconds.

While you wait, have you tried resetting your router?

Question about your bill? Click here to see explanations of any new or different charges.

Also, consider visiting this link to see a page with answers to some frequently answered questions which may help.

Thank you, and Agent A should be with you soon.

*Fig. 2D*

Contact Center Manager Application — □ X

Contact Center Manager:

Incoming call from Diana (96 % likelihood)

- Expected language: English (82 % likelihood) or Spanish (10 % likelihood)
- Expected issue: Internet connection slow (30 % likelihood) or Billing question (22 % likelihood)
- Expected call length: 5 minutes 20 seconds Here are acceptable available agents:

- Agent A   (Suggested)   Optimality Score: 100
  Speaks English and Spanish, proficient in internet connectivity and billing issues
  Available in 45 seconds
- Agent B   Optimality Score: 96
  Speaks English but not Spanish, proficient in internet connectivity and billing issues
  Available in 20 seconds
- Agent C   Optimality Score: 94
  Speaks English and Spanish, proficient in internet connectivity but not billing issues
  Available immediately Click here to accept suggested agent
Click here to override suggested agent

SYSTEMS AND METHODS OF CONTACT CENTER CLIENT ASSIGNMENT LEVERAGING QUANTUM COMPUTATION

CROSS-REFERENCE TO RELATED PATENT APPLICATIONS

This application claims the benefit of priority from U.S. Provisional Patent Application No. 63/149,980, filed Feb. 16, 2021, which is incorporated herein by reference in its entirety.

FIELD

Embodiments of the present disclosure relate generally to communication methods and more particularly to leveraging quantum computing resources for client-agent assignments.

BACKGROUND

Conventional contact centers employ classical computers and computing resources to enable functionality of the contact center. A downside to relying upon classical computers and computing resources is that such devices reach a performance ceiling requiring both extreme processing power and memory in addition to long database searches.

For example, a conventional contact center is incapable, regardless of the computing power it employs, of accurately and timely assigning a best or most optimal agent to a new caller. As a result, callers experience drastic wait times. As new callers call into the contact center, the number of callers on hold increases. Such a contact center may thus be incapable of operating as required. These issues are most acute for contact centers having a high number of agents and when the callers outnumber the agents or when the number of callers far exceeds the number of available (i.e., free) agents.

BRIEF SUMMARY

An improved contact center is proposed to leverage non-traditional computing resources lacking the drawbacks of traditional computing resources. Specifically, embodiments of the present disclosure contemplate a contact center leveraging quantum computing resources. The quantum computing resources can be used to reduce the time and/or decision-making requirements required by a contact center before a call is forwarded to an agent. The contact center of the present disclosure may be configured to scale contact center capacity beyond previously envisioned limits. The quantum computing resources may allow the contact center to predict, for example, language and/or subject questions for a contact (i.e., a caller, user, or customer contacting the contact center) and further prepare optimal responses (e.g., answers) to the question based on a number of data inputs (e.g., interaction history). The data inputs used to prepare the optimal responses may be based on data inputs that are in a multi-dimensional set in a database.

During the process of work assignment (e.g., mapping an agent to a work item in a contact center), the state of the art is to use multiple attributes of a caller to match multiple attributes of an agent, also known as attribute-based matching. However, contact centers desire to optimize their collection of matches and there are a lot of ways to approach optimization. Optimization provides a metric (or measure) that reflects how good a potential match is from a customer to an agent. That optimization could be based on some dimension of interest from a cost perspective or an efficacy perspective.

But as the number of contacts (e.g., calls, messages, social media posts, etc.) goes up and the number of agents working in a contact center increase, the number of variables that can be considered for certain optimizations goes up. With the increase in scale and dimensionality of variables, the math associated with optimization becomes exceptionally intimidating. This style of problem fits in a non-polynomial space, which means from a compute perspective as the number of things you want to compute goes up, it becomes compute-impractical from a classical computing perspective. Traditional computers reach a performance "ceiling" requiring both extreme processing power and memory and long database searches.

Traditional computers cannot do the computations needed in large scale contact centers fast enough at a reasonable cost. The math is proven and requires another form of computing resource—quantum computing resources. The computational cost for a classical computer is astronomical. Complexity classes describe what classical computers can solve in reasonable time—it gets more and more complex.

There exists a set of questions which may not be solvable within a particular amount of time using conventional computer resources, i.e., non-quantum resources. The answers to the questions of same set of questions may, on the other hand, be capable of being verified within a particular amount of time using the same conventional computer resources.

Such questions may include determining set of possible questions to be asked by a person calling into a contact center based on information associated with the person. As described herein, it may be possible to estimate the likelihood of a question to be asked by a caller based on information such as caller history, caller identity, caller location, etc. Similarly, it may be possible to identify a most optimal agent based on information associated with a caller calling into a call center.

Using conventional computer resources, however, the amount of time for a conventional computer system to make such estimations may exceed a reasonable amount of time for a contact center receiving a call to field the call and assign the call to an agent. For this reason, a problem exists: how can a contact center receiving a call from a caller identify the caller, determine the most optimal agent to answer the call, generate a list of likely questions to be asked by the caller, and generate a set of answers to each likely question, within a reasonable amount of time so that the caller does not experience an unreasonable wait or hold time?

It has been shown that, while conventional computing systems are incapable of making such determinations and estimations, computing systems leveraging quantum computing resources are capable of outputting a probabilistic data set including such determinations and estimations. As a result, attempting to scale a contact center may be impractical from a cost or time point of view if appropriate parallel computing architectures (e.g., quantum computing resources) are not employed. For this reason, solutions to these problems can benefit from parallelism utilizing a traditional computing system in communication with a quantum computing resource. Parallel computing can be performed with quantum computing resources, which is but one example of a parallel computing architecture that can be employed by a contact center in accordance with at least some embodiments of the present disclosure. It should be appreciated, however, that certain embodiments of the present disclosure may not be limited to leveraging quantum computing resources for the purposes of providing parallelism to a contact center. Rather, quantum computing resources provide one example technology.

Embodiments of the present disclosure contemplate using quantum computing resources to successfully scale a contact center capacity. In some examples, the contact center may be configured to offload certain initial contact center decisions to a quantum computer or quantum computing resources to achieve a problem space reduction. The quantum computer or quantum computing resources may provide inputs in response to the contact center enabling the contact center to leverage traditional computing resources to complete an agent assignment and/or work item matching decision. As an example, the contact center may leverage a contact center forrelations template to predict a next event that will occur in the contact center. As used herein, forrelations may refer to a property-testing problem which optimally separates quantum computing from classical or traditional computing. With the prediction information generated by the quantum computing resources, the contact center is better equipped to react to an event because the occurrence of the event has already been predicted by the contact center forrelation generated at the quantum computing resources and the traditional computing resources are able to operate on the actual event when the event occurs.

As an example, the contact center may not attempt to match agents to work items in real time. Rather, the contact center may be configured to anticipate the ability to match an agent. The anticipation could allow the contact center to get out of a compute knot. Instead of relying on traditional computing resources, the contact center may send that problem to a quantum computing resource. If the problem is properly formulated, the quantum computing resources will return a probabilistic result on proposed matches that are consumable by the traditional computing resources of the contact center. At this point, the contact center can employ more traditional computing methods to achieve good agent selection (e.g., optimization) at extreme scale for a contact center.

An advantage offered by the quantum computing resources is a large-scale reduction of time and options before a call is forwarded to an agent. The quantum computing resources can be inserted in between a traditional computer and the contact center server for problem space reduction.

It may be beneficial for the contact center to anticipate what the next question is going to be—in other words, "What is the next problem coming into the contact center?". Since this question is being asked of a quantum computer, all possible combinations are analyzed in parallel. It becomes possible to capture all possible questions in one universal space that can come from a caller's phone number, email address, Instant Messaging (IM) address, social media address, other messaging, etc. Based on prior experiences and other information known to the contact center (e.g., data pulled from a customer relationship management (CRM) database, contact history database, etc.), the contact center may be enabled to know to a particular degree of confidence the language a caller will speak, potentially know the topics a caller has asked about before, such as based on equipment owned by the caller, and answers the caller has received in previous interactions. With this information available, the contact center may be equipped to match the caller to the best agent currently on shift with all (or the most) of the skillsets, language needs, human interactive skills, technical skills, etc. All of the possibilities can be computed ahead of time and in parallel on the quantum computer. Once the problem space is reduced, the matching problem can be optimized down to normal. At this point the contact center can hand the matching problem off to traditional computing resources. The data set coming from the quantum computer may include a series (e.g., like rolling a die—possibilities). There may be multiple sequences of random numbers coming back with an anticipation of the most likely question from any source.

A quantum computing resource may be used in some embodiments to predict or estimate an issue, topic, question, etc., which may be raised by a user such as a customer contacting a contact center. As an example, when a call is received by the contact center, the contact center, based at least in part on caller ID information, may be configured to determine an identity of the caller. Determining the identity of the caller may comprise determining whether the caller is a current or past customer, determining a location or address of the caller, determining a name of the caller, determining whether the caller is associated with any social media profiles, etc. As an example, if a lawyer who is not a customer of the contact center calls, the call may be received by a first computing system of the contact center which may pass a set of data on to one or more quantum computing resources. The quantum computing resources may, as described herein, be configured to determine a probability of the caller raising a legal issue regarding a customer or a contract. The quantum computing resources may, as described herein, transmit such data to the first or another computing system so that such data may be used by an agent or a chatbot when communicating with the caller.

Anticipating the caller and the topic to a series of information of data that can be further processed using lookups on a traditional database computer becomes powerful in the context of a contact center. By making such determinations, the quantum computer effectively minimizes the problem space, or the infinite space of possibilities, into a calculable small number of answers capable of being analyzed using conventional computing elements. The quantum computer is unique in that it has all possible variables. A quantum algorithm can yield a polynomial or quadratic speedup relative to its classic counterpart and still fundamentally scale super-polynomially. The output of the quantum computer may be in some embodiments a most likely question and answer in the correct language for the incoming caller. This data may be presented to an agent to prepare him or her in advance with a display on a screen in two or three seconds from the time the call comes into the contact center.

Continuing the above example, a list may be presented to the caller by the contact center. The list may include, for example, the previous ten matters most recently discussed. where the caller can then choose from the list. For example, as discussed below, upon a caller calling into the contact center—or contacting the contact center through a browser or text-messaging application, etc.—the caller may be presented with a user interface which may address potential issues to be raised by the caller as predicted through the use of the quantum computing resources. Such a user interface may be presented to the caller while the caller is waiting on hold for an agent to become available.

In some embodiments, a contact center may be provided with a server that receives an incoming call and receives output from a quantum computer which prioritizes most likely potential matches for the incoming call. The output received from the quantum computer may be probabilistic and optimized. For example, the quantum computer may provide a series comprising a particular subset of agents of all agents of the contact center which may be the most likely to be a good match to the incoming call. The server of the contact center can then quickly prioritize the best agents for the call. In this way, the quantum computer may effectively reduce the problem space for the conventional computing elements utilized by the contact center, thus making the overall problem of finding the best agent for the call computationally easier. The server of the contact center may also open the most recent work items associated with the caller so that they can be easily recovered and handled in a timely manner during the call.

BRIEF DESCRIPTION OF THE DRAWINGS

FIG. 2B is an illustration of a user interface in accordance with at least some embodiments of the present disclosure;

FIG. 2C is an illustration of a user interface in accordance with at least some embodiments of the present disclosure;

FIG. 2D is an illustration of a user interface in accordance with at least some embodiments of the present disclosure;

FIG. 4B is an illustration of a user interface in accordance with at least some embodiments of the present disclosure.

DETAILED DESCRIPTION

Figure 1:
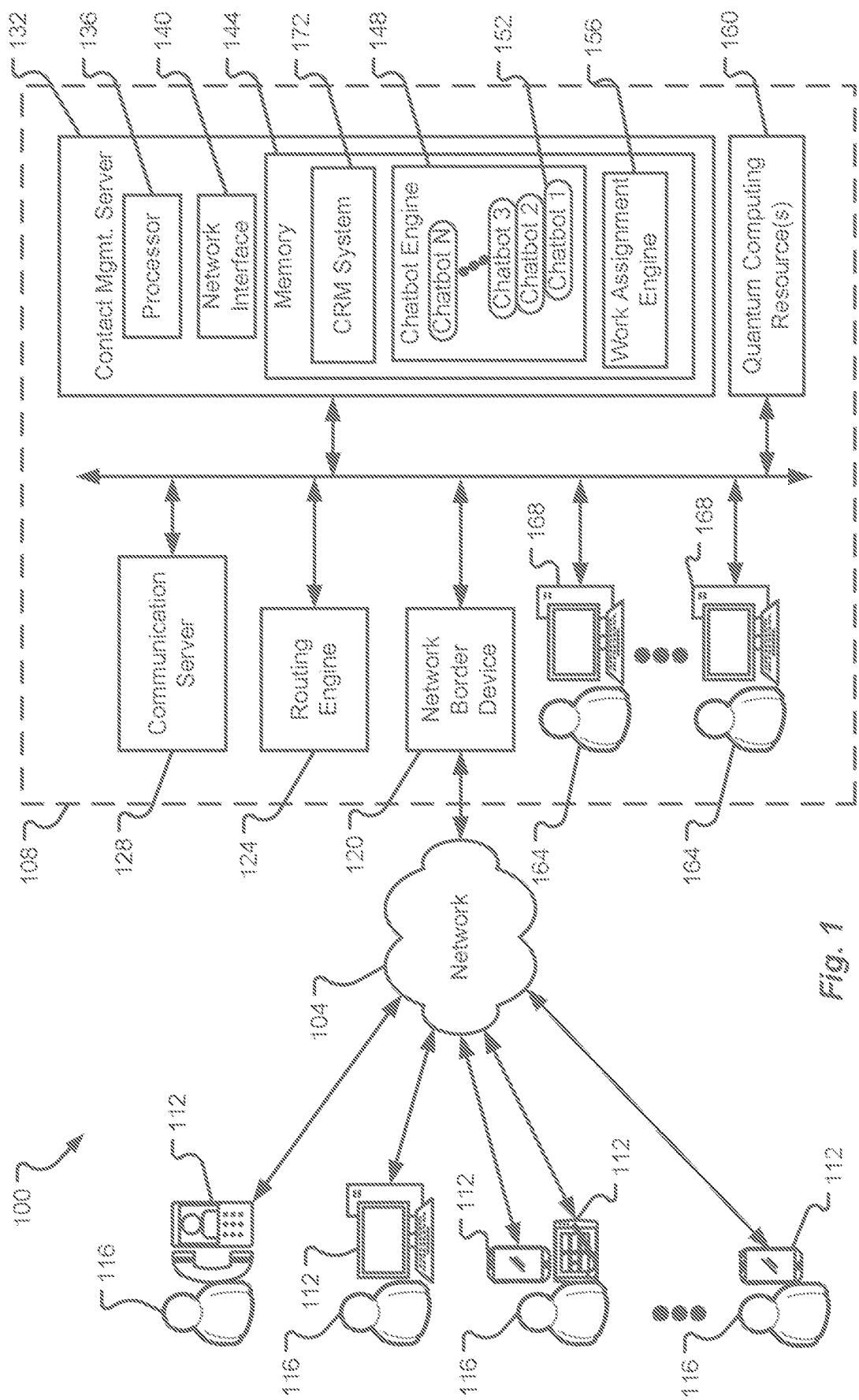
FIG. 1 is a block diagram illustrating a communication system in accordance with at least some embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure in any way. Furthermore, to avoid unnecessarily obscuring the present disclosure, the preceding description omits a number of known structures and devices. Such omissions are not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the illustrative aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined into one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Embodiments of the disclosure provide systems and methods for leveraging quantum computing resources to facilitate contact center functions. Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

It should be appreciated that the contact center depicted and described herein can be configured to process incoming communications of any type. The contact center may also be configured to process conversations or interactions after they have been in process for an amount of time (e.g., as part of determining whether to transfer a caller or as part of managing an open social media channel).

Specific, but non-limiting, examples of communication channels that may be managed by the contact center include: (1) "Over-the-Top" (OTT) channels, including: Facebook Messenger, Twitter DM, WeChat, WhatsApp, Apple Business Chat, LINE, KakaoTalk; (2) "Telco" channels, including: SMS and Google RCS; (3) outbound, App-to-Person ("A2P") messages, used by enterprise customers to facilitate various enterprise-specific communications (e.g., notifications, alerts, promotions, etc.); and/or (4) "Real Time Messaging" (RTM) channels, including: In-App messaging (Android, iOS and W/eb), Push messaging (Android, iOS and Browser Notifications), etc.

It some embodiments, topics may be uploaded into a customer relationship management (CRM) system and/or customer journey application executed within the contact center. The CRM system and/or customer journey application may be executed on a purpose-built server or may be executed by a server that is also implementing contact routing routines within the contact center.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C. § 112. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized.

Examples of the traditional computing processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Methods described or claimed herein can be performed with finite executable instruction sets operating on a fixed set of inputs and configured to provide one or more defined outputs. Alternatively, or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein. Additionally, certain methods may be performed with quantum computing resources.

Referring initially to FIG. 1, a communication system 100 will be described in accordance with at least some embodiments of the present disclosure. The communication system 100 is shown to include a communication network 104 that interconnects a contact center 108 and resources thereof with multiple customer communication devices 112. As the name suggests, a customer communication device 112 may be owned and/or operated by a customer 116. The customer 116 may correspond to a user or person that interacts with their customer communication device 112 to communicate with a resource of the contact center 108. Specifically, the contact center 108 may include a number of resources that facilitate customer 116 interactions via one or multiple communication channels presented to and maintained for use by the customer 116 and one or more of their customer communication devices 112. As shown in FIG. 1, a customer 116 may utilize one or multiple customer communication devices 112 to interact with the contact center 108. Moreover, embodiments of the present disclosure contemplate that the customer 116 may use multiple different customer communication devices 112 to communicate via a single communication channel. As a non-limiting example, a customer 116 may call a predetermined number that is associated with the contact center 108 using their customer communication device 112. As another example, the customer 116 may login to a web-based portal or authenticate themselves with a particular chat channel and then utilize the web-based portal or chat channel to communicate with any one of their customer communication devices 112. As another example, a customer 116 may utilize one communication device 112 for voice communications while utilizing another communication device 112 for text-based communications. As should be appreciated, a customer 116 may use any potential electronic means of communication to communicate with the contact center 108.

A customer communication device 112 may correspond to a computing device, a personal communication device, a portable communication device, a laptop, a smartphone, a personal computer, and/or any other device capable of running an operating system, a web browser, or the like. For instance, a customer communication device 112 may be configured to operate various versions of Microsoft Corp.'s Windows® and/or Apple Corp.'s Macintosh® operating systems, any of a variety of commercially available UNIX® such as LINUX or other UNIX-like operating systems, iOS, Android®, etc. These customer communication devices 112 may also have any of a variety of applications, including for example, web browser applications, chat applications, social media applications, calling applications, etc. A customer communication device 112 may alternatively or additionally be any other electronic device, such as a thin-client computer, Internet-enabled mobile telephone, and/or personal digital assistant, capable of communicating via communication network 104 and/or displaying and navigating web pages or other types of electronic documents.

The communication network 104 can be any type of network familiar to those skilled in the art that can support data communications using any of a variety of commercially available protocols, including without limitation SIP, TCP/IP, SNA, IPX, AppleTalk, and the like. Merely by way of example, the communication network 104 may correspond to a LAN, such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the IEEE 802.11 suite of protocols, the Bluetooth® protocol known in the art, and/or any other wireless protocol); and/or any combination of these and/or other networks.

The contact center 108 is shown to include one or more computing devices that enable a contact center agent 164 and/or chatbot 152 to interact with a customer 116 via a communication channel established between the customer communication device 112 and the contact center 108. In particular, the contact center 108 is shown to include a network border device 120 and a number of servers 124, 128, 132 that enable functionality of the contact center 108. The servers 124, 128, 132 may be referred to herein as traditional computing resources or may include traditional computing resources. The contact center 108 is also shown to include quantum computing resource(s) 160 which may be configured to reduce a problem space for the traditional computing resources of the contact center 108 as will be described in further detail herein. In some embodiments, the quantum computing resource(s) 160 may include including a quantum circuit model, a quantum Turing machine, a quantum annealing computer, an adiabatic quantum computer, a one-way quantum computer, various quantum cellular automata, and/or some combination thereof.

The network border device 120 may correspond to one or a number of devices that establish and maintain information security policies for the contact center 108. The network border device 120, in some embodiments, may include a Session Border Controller (SBC), a firewall, a Network Address Translator (NAT) device, a protocol converter, or combinations thereof. Because the communication network 104 may be untrusted from the perspective of an operator of the contact center 108, the network border device 120, in some embodiments, may be configured to implement security policies or rules. When communications, messages, packets, or the like are received at the network border device 120, components of the network border device 120 may analyze the received communications, messages, packets, etc. to determine if the contents of the received communications, messages, packets, etc. can be safely passed to other components of the contact center 108. In some embodiments, all contents that safely pass through the network border device 120 may be transferred to the communication server 128 or routing engine 124 for further analysis and processing (e.g., for inclusion with a particular conversation, for assigning/forwarding to a particular contact center agent 164, for assigning/forwarding to a particular chatbot 152, etc.).

In some embodiments, each server 124, 128, 132 of the contact center 108 may be configured to perform a particular task or a set of tasks specific to supporting functions of the contact center 108. For instance, the routing engine 124 may correspond to a server or set of servers configured to receive message(s) from one or more contacts via the network border device 120 and make or implement routing decisions for the message(s) or contacts within the contact center 108. The communication server 128 may correspond to a single server or a set of servers configured to establish and maintain a communication channel between one or more customers 116 and an agent 164, chatbot 152, set of agents 164, and/or set of chatbots 152 of the contact center 108. In some embodiments, the routing engine 124 and communication server 128 may work in cooperation to ensure that an appropriate agent 164, chatbot 152, set of agents 164, and/or set of chatbots 152 are assigned to a particular communication channel for purposes of servicing and/or addressing contacts initiated by customers 116 of the contact center 108. Specifically, but without limitation, the routing engine 124 may be configured to determine which agent 164 or chatbot 152 should be assigned to a particular communication channel for purposes of answering a customer's 116 question and/or for purposes of providing a service to the customer 116. As will be discussed in further detail herein, the routing engine 124 may receive inputs from the contact management server 132 that include information describing a selected contact center resource (e.g., chatbot 152 and/or human agent 164) for assigning to a customer 116 contact.

The routing engine 124 may provide appropriate signaling to an agent's communication device 168 that enables the agent's communication device 168 to connect with the communication channel over which the customer 116 is communicating and to enable the agent 164 to view messages sent by the customer's communication device 112, which may eventually be assigned to and posted on the appropriate communication channel. As a more specific example, the communication server 128 may establish and maintain a digital chat communication channel which may be presented to the customer's communication device 112 and enable the customer 116 to send messages to the contact center 108 when desired. When messages are received from a customer communication device 112 and assigned to a particular chat communication channel, the routing engine 124 may determine which agent 164 or chatbot 152 will service needs of the customer 116 (e.g., answer a question, provide a service, etc.) and then connect the selected agent's communication device 168 and/or chatbot 152 to the same chat communication channel, thereby enabling the agent 164 and/or chatbot 152 to engage in a chat session with the customer 116. Alternatively, or additionally, as will be described in further detail herein, the routing engine 124 may perform a cost-benefit analysis as part of making a routing decision with respect to a chatbot 152. For example, the routing engine 124 may be configured to consider a cost associated with using a particular chatbot 152 versus the cost associated for using a particular agent 164 for servicing a customer 116 and weigh that cost against the potential benefit associated with successfully completing the interaction with the customer 116 (e.g., a sales or revenue benefit, a customer satisfaction rating, etc.).

It should be appreciated that the routing engine 124 may be configured to connect both a human agent 164 and one or multiple chatbots 152 to a particular communication channel if it is determined to be desirable to enable the automated agent respond to the customer's 116 messages in a semi-automated fashion (e.g., where the chatbot 152 is enabled to generate a suggested reply to a message, but a human agent 164 is required to approve or edit the suggested reply prior to the suggested reply being transmitted/committed to the communication channel as a message and delivered to the customer communication device 112).

It should be appreciated that the communication server 128 may be configured to support any number of communication protocols or applications whether synchronous or asynchronous. Non-limiting examples of communication protocols or applications that may be supported by the communication server 128 include the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc. In addition to supporting text-based communications, the communication server 128 may also be configured to support non-text-based communications such as voice communications, video communications, and the like.

Another server or set of servers which may be provided in the contact center 108 is a contact management server 132. The contact management server 132 may be configured to manage the contacts or work items that exist within the contact center 108 and that represent tasks to be performed by a human agent 164 and/or chatbot 152 in connection with providing a service to a customer 116. The contact management server 132 may be configured to maintain state information for some or all of the contacts in the contact center 108 at any given point in time. Work assignment decisions may be made by the contact management server 132 by implementing a work assignment engine 156. The work assignment engine 156 may correspond to a set of instructions which may be executable by the processor 136 and can be configured to make agent 164 or chatbot 152 assignment decisions for a contact received in the contact center 108.

As part of making work assignment decisions, the work assignment engine 156 may also be configured to interface with the quantum computing resource(s) 160. As mentioned above, the quantum computing resource(s) 160 may be configured to reduce a problem space for the traditional computing resources of the contact management server 132. Thus, the work assignment engine 156 (or other component within the contact management server 132) may be configured to provide certain information to the quantum computing resource(s) 160 and receive one or more outputs from the quantum computing resource(s) 160 in response. The outputs from the quantum computing resource(s) 160 may be generated as a result of the quantum computing resource(s) 160 processing the information provided by the work assignment engine 156 (or other component within the contact management server 132).

In some embodiments, the memory 144 of the contact management server 132 may comprise a customer relationship management (CRM) system 172. The CRM system 172 may comprise a CRM database which may store data relating to customers or other users associated with the contact center. Illustratively, but without limitation, the CRM system 172 may comprise information determined about one or more contacts such as an identifier associated with at least one of the customer communication device 112 and the customer 116, a phone number, an email address, an Instant Messaging (IM) address, a username, customer history information, customer status information, historical records, metadata associated with previous interactions between the customer 116 and the contact center 108, customer loyalty information, customer status information, purchase history for the customer 116, previous contacts associated with the customer 116, etc.

While certain components are depicted as being included in the contact management server 132, it should be appreciated that such components may be provided in any other server or set of servers in the contact center 108. For instance, components of the contact management server 132 may be provided in a routing engine 124 and/or communication server 128, or vice versa. Further still, embodiments of the present disclosure contemplate a single server that is provided with all capabilities of the routing engine 124, the communication server 128, and the contact management server 132.

Additionally, while depicted as residing within the contact center 108, it should be appreciated that the quantum computing resource(s) 160 may not necessarily reside in the contact center 108 (e.g., may not be connected to a LAN of the contact center 108 or be provided behind the network border device 120). Rather, the quantum computing resource(s) 160 may be hosted outside the contact center 108 and the contact management server 132 may include instructions enabling secure communications with the quantum computing resource(s) 160 and/or other forms of integration with the quantum computing resource(s) 160.

The contact management server 132 is shown to include a processor 136, a network interface 140, and memory 144. The processor 136 may correspond to one or many computer processing devices. Non-limiting examples of a processor include a microprocessor, an Integrated Circuit (IC) chip, a Graphics Processing Unit (GPU), a Data Processing Unit (DPU), a Central Processing Unit (CPU), or the like. Examples of the processor 136 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The network interface 140 may be configured to enable the contact management server 132 to communicate with other machines in the contact center 108 and/or to communicate with other machines connected with the communication network 104. The network interface 140 may include, without limitation, a modem, a network card (wireless or wired), an infra-red communication device, etc.

The memory 144 may include one or multiple computer memory devices. The memory 144 may be configured to store program instructions (e.g., the work assignment engine 156) executable by the processor 136 and which may provide functionality of the communication management server 132 as described herein. The memory 144 may also be configured to store data or information that is useable or capable of being called by the instructions stored in memory 144.

The memory 144 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 144, in some embodiments, corresponds to a computer-readable storage media and while the memory 144 is depicted as being internal to the contact management server 132, it should be appreciated that the memory 144 may correspond to a memory device, database, or appliance that is external to the contact management server 132.

Illustratively, the memory 144 is shown to store a chatbot engine 148, which includes a plurality of different chatbots 152. Each of the chatbots 152 may be configured for execution by the processor 136. In some embodiments, one or more chatbots 152 may correspond to a set of processor-executable instructions (e.g., a finite instruction set with defined inputs, variables, and outputs). In some embodiments, a chatbot 152 may correspond to an Artificial Intelligence (AI) component of the contact management server 132 that is executed by the processor 136.

Figure 2A:
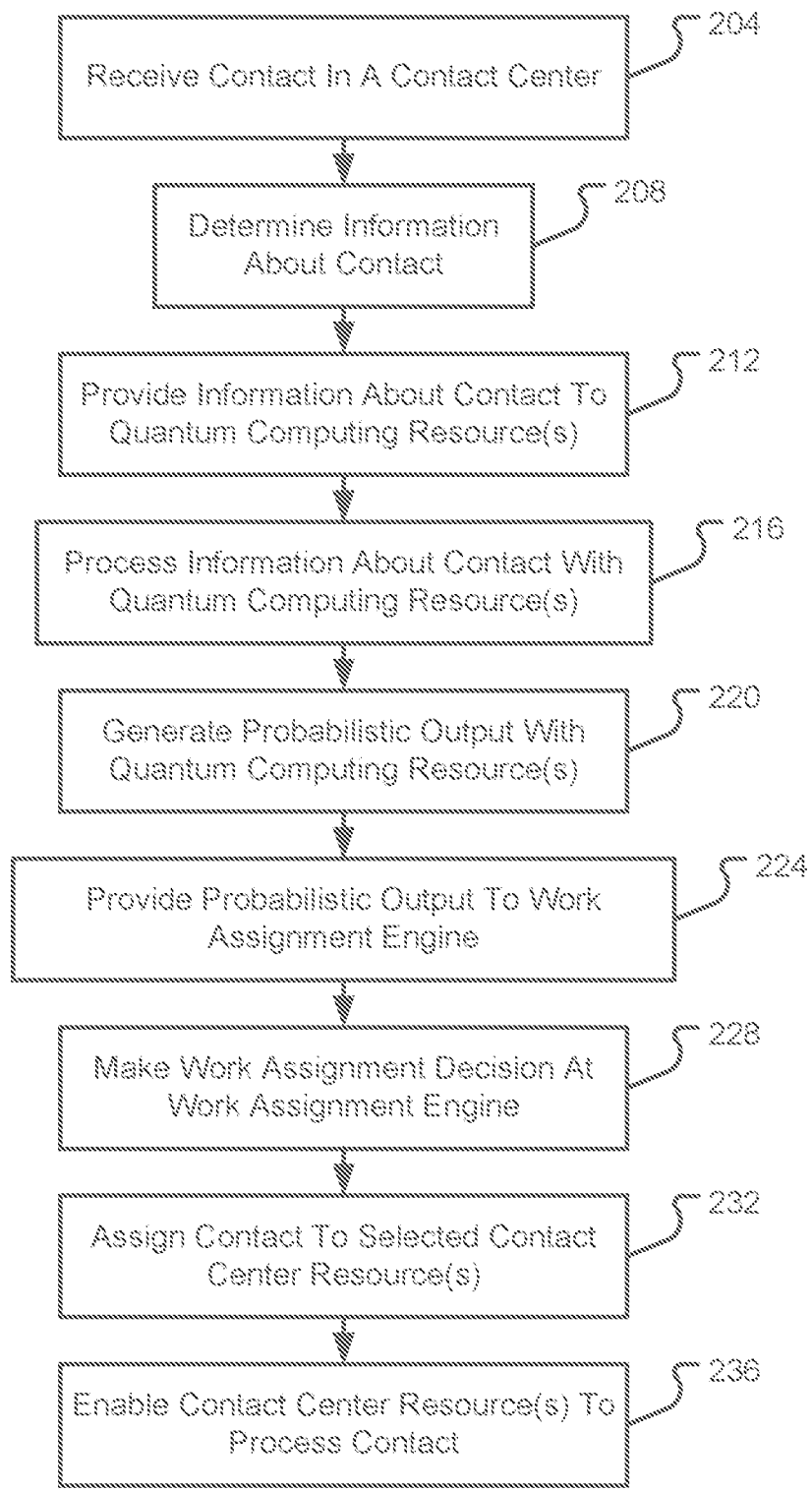
FIG. 2A is a flow diagram illustrating a first method of operating a contact center in accordance with at least some embodiments of the present disclosure.
Figure 3:
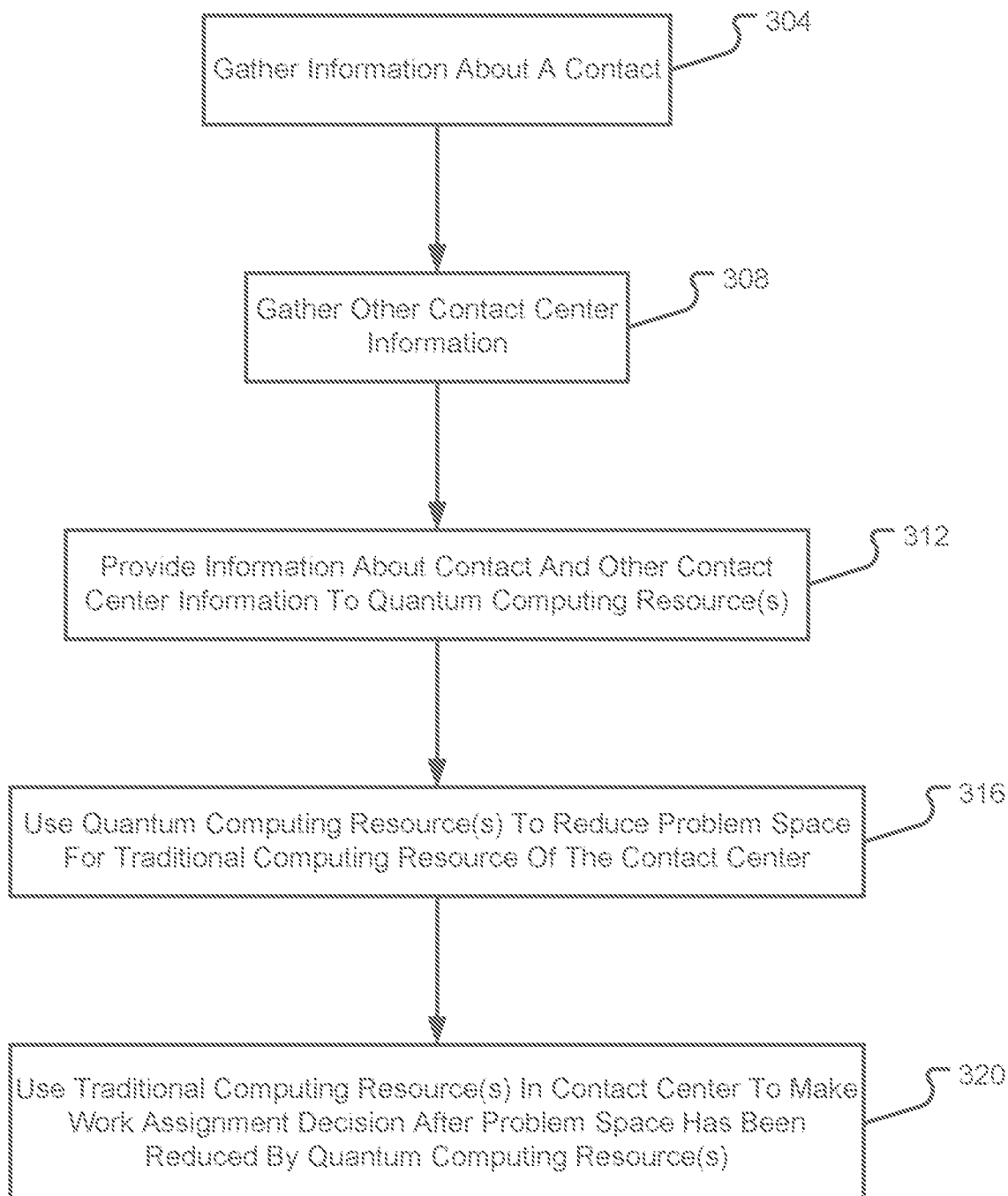
FIG. 3 is a flow diagram illustrating a second method of operating a contact center in accordance with at least some embodiments of the present disclosure.
Figure 4A:
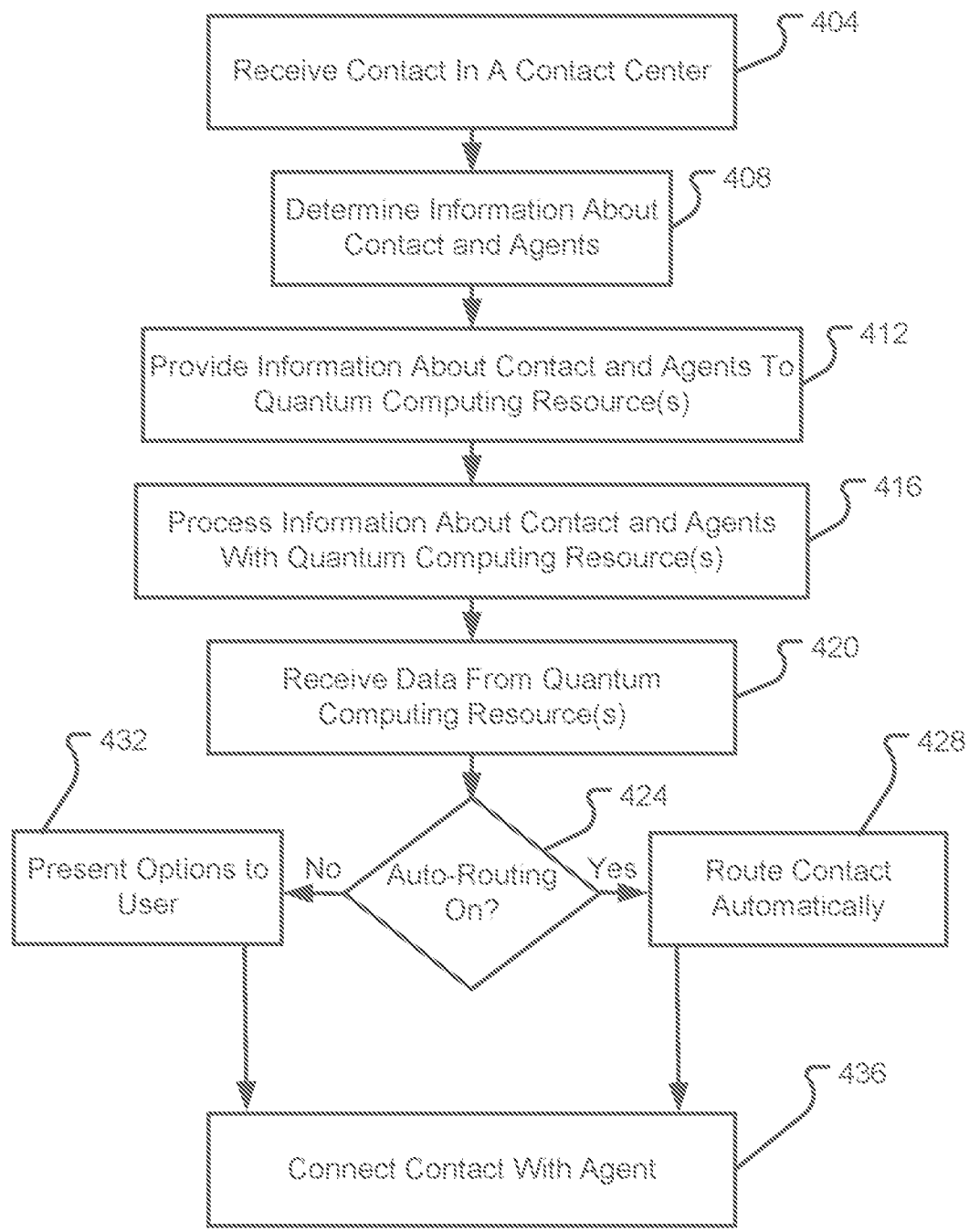
FIG. 4A is a flow diagram illustrating a second method of operating a contact center in accordance with at least some embodiments of the present disclosure.

With reference now to FIGS. 2A, 3, and 4A, various methods will be described in accordance with at least some embodiments of the present disclosure. The methods described herein may be combined with one another or steps from one method may be used in another method without departing from the scope of the present disclosure. Moreover, while certain methods and steps of methods will be described as being performed by particular system 100 components, it should be appreciated that any of the components described herein can be configured to perform some or all of the method steps depicted and described herein. Further still, while certain methods are described as having method steps performed in a certain order, it should be appreciated that the order of method steps may be changed or altered without departing from the scope of the present disclosure.

Referring now to FIG. 2A, a first method of operating a contact center 108 will be described in accordance with at least some embodiments of the present disclosure. The method begins when a contact is received by the contact center 108 (step 204). The contact may be received as a result of a customer 116 (or other type of user) calling, emailing, texting, messaging, or otherwise communicating with the contact center 108. Alternatively, or additionally, the contact may correspond to a communication initiated by the contact center 108 (e.g., an outbound contact) directed toward a particular customer 116 (or other type of user).

Upon receiving the contact, the method continues with the routing engine 124 and/or contact management server 132 determining information about the contact (step 208). The information determined about the contact may include data associated with the contact, data associated with the customer 116, data associated with the communication, data associated with the customer communication device 112, etc. Illustratively, but without limitation, the information determined about the contact may include an identifier associated with at least one of the customer communication device 112 and the customer 116. More specifically, the information about the contact may include at least one of a phone number, email address, Instant Messaging (IM) address, and username. The information about the contact may alternatively or additionally include customer history information and/or customer status information obtained from a CRM database such as from the CRM system 172. Customer history information may include some or all historical records or metadata associated with previous interactions between the customer 116 and the contact center 108. Customer history information may also include customer loyalty information, customer status information, purchase history for the customer 116, previous contacts associated with the customer 116, etc.

Some or all of the information determined about the contact may be provided to the quantum computing resource(s) 160 (step 212). The quantum computing resource(s) 160 may be configured to reduce a problem space for the traditional computing resources of the contact management server 132.

The quantum computing resource(s) 160 may process the information determined about the customer (step 216). In some embodiments, the quantum computing resource(s) 160 may be configured to process the information about the contact in a parallelized computing environment. Reducing a problem space for the traditional computing resources of the contact management server 132 may comprise, in some embodiments, effectively narrowing down the choices between which the contact management server 132, or other traditional computing elements, must choose. For example, the quantum computing resource(s) 160 may reduce the set of all agents available to the contact center to a subset of agents who are both available and optimal to converse with the customer based on the information determined about the contact as discussed below. The quantum computing resource(s) 160 may be configured to output the subset of agents to the traditional computing elements which may be configured to process the subset of agents and choose one agent from the subset as discussed below.

Processing the information determined about the customer (step 216) may comprise determining, based on the information determined about the customer, a set of probable requirements or qualities which may be desired to optimally respond to the customer. For example, the quantum computing resource(s) 160 may be configured to determine a language which may be spoken by the customer, determine one or more questions which may be asked by the customer, determine one or more issue areas which may be addressed by the customer, etc. Such determinations may be made by the quantum computing resource(s) based on the information provided to the quantum computing resource(s) 160 (in step 212) which may include, for example, caller history, agent notes relating to previous calls with the customer, social media database information associated with the customer, etc.

Any information determined to be relevant to the customer by the quantum computing resource(s) may be used by the quantum computing resource(s) to generate a set of requirements or assets which are considered as desirable when choosing an agent to speak with the customer. Based on these requirements or assets, the quantum computing resource(s) 160 may be configured to determine which agents of all agents available to the contact center are available and which meet the language, technology skills, and/or any other relevant requirements, assets, or factors associated with the customer.

Based on the quantum computing resource(s) 160 processing the information determined about the customer, the quantum computing resource(s) 160 may next generate a probabilistic output (step 220). The output generated by the quantum computing resource(s) 160 may include a probabilistic output comprising a data set or sets describing one or more of: a plurality of possible topics with which the contact is associated; a plurality of possible language requirements of the contact; and a plurality of possible skills required of the contact center resource to meet a need of the contact. The probabilistic output may alternatively or additionally include a probability associated with data of the data sets described above. For example, the probabilistic output may include a data set describing a plurality of possible topics with which the contact is associated along with a probability associated with each of the plurality of possible topics. As another example, the probabilistic output may include a data set describing a plurality of possible language requirements of the contact along with a probability associated with each of the plurality of possible language requirements. As another example, the probabilistic output may include a data set describing a plurality of possible skills required of the contact center resource to meet a need of the contact along with a probability associated with each of the plurality of possible skills.

Other possible probabilistic outputs may include estimations of questions which may be asked by the customer 116 associated with the contact and/or a set of answers to estimated questions which may be asked by the customer 116 associated with the contact. For example, a probabilistic output may include a most likely question to be posed by a customer 116 associated with the contact and an answer to the most likely question to be posed by the customer 116. The answer(s) may be generated in a language that is determined by the quantum computing resource(s) 160 to be most likely understood by the customer 116. As can be appreciated, the probabilistic output may include a number of candidate answers to the most likely question or a number of candidate answers to a predetermined number of most likely questions (e.g., five possible answers to the top ten most likely questions to be posed by the customer 116). In such a scenario, the probabilistic output may identify a probability associated with each answer satisfying the question considered to be most likely (or any question) to be posed by the customer 116.

In some embodiments, the probabilistic output generated by the quantum computing resource(s) 160 may comprise a set of agents which are probabilistically determined to be or soon be available and/or to meet the above discussed requirements or desirable assets. For example, the probabilistic output generated by the quantum computing resource(s) 160 may comprise a list of agents as well as explanatory information such as an indication as to which requirement and/or desirable asset each agent meets or possesses. Because each requirement and/or desirable asset may be only probabilistically determined, i.e., determined to a particular probability level, an agent meeting each and every determined requirement and/or desirable asset may only be of a particular probability as being a desirable agent to speak with the customer. For this reason, each agent of the list of agents may be associated with a set of probabilities or an overall probability of the agent being an optimal agent for the particular customer. For example, if a customer is 80% likely to speak English and 20% likely to speak French, an agent who only speaks English may be 80% likely to be an optimal agent while an agent who speaks both English and French may be 100% likely to be optimal.

In some embodiments, the probabilistic output generated by the quantum computing resource(s) 160 may be provided back to the traditional computing environment (e.g., back to the contact management server 132) within a realistic timeframe based on expected desires and/or needs of the customer 116 (step 224). For example, a customer calling into a customer service hotline may expect to speak to a human within sixty seconds. If the probabilistic output fails to be returned within the required timeframe, the customer may hang up the phone or otherwise give up on the customer service hotline. As a non-limiting example, the probabilistic output is provided back to the traditional computing environment within at least ten seconds of the quantum computing resource(s) 160 receiving the information about the contact. As another non-limiting example, the probabilistic output is provided back to the traditional computing environment within at least five seconds of the quantum computing resource(s) 160 receiving the information about the contact. As another non-limiting example, the probabilistic output is provided back to the traditional computing environment within at least two or three seconds of the quantum computing resource(s) 160 receiving the information about the contact. In this way, the quantum computing resource(s) 160 can provide meaningful inputs to the work assignment 156 which enable the work assignment engine 156 to make a work assignment decision in an amount of time acceptable by the customer 116 associated with the contact. Due to the multi-dimensional processing requirements for narrowing down a set of agents to a smaller subset of available and satisfactory agents, a traditional computing resource like the processor 136 may require an extreme amount of time, e.g., days, months, or years, to generate a similar probabilistic output which may be unacceptable to the customer 116.

Upon receiving the probabilistic output from the quantum computing resource(s) 160, the work assignment engine 156 may be enabled to make a work assignment decision for the contact (step 228). The work assignment decision may be made using skill-based work assignment techniques. For instance, the work assignment engine 156 may match determined or probable skills identified as being associated with the contact with skills identified as being associated with one or more agents 164 and/or chatbots 152. The work assignment engine 156 may select one or multiple contact center resources (e.g., an agent 164 and/or chatbot 152) for assignment to the contact based on the probabilistic output received from the quantum computing resource(s) 160 along with other inputs available to the work assignment engine 156 (step 232). Other information that may be available to the work assignment engine 156 may include agent availability information, agent skill information, contact skill requirements, etc.

The work assignment decision made by the work assignment engine 156 may next be provided to the routing engine 124 and/or communication server 128 to enable the selected contact center resource to begin processing the contact (step 236). For example, a communication channel may be established between the customer communication device 112 and the agent communication device 168. Alternatively, or additionally, a communication channel may be established between the customer communication device 112 and a selected chatbot 152. The agent 164, in some embodiments, may be provided with some or all of the probabilistic outputs generated by the quantum computing resource(s) 160, to the extent that the probabilistic outputs may enable the agent 164 to address the customer 116 questions more efficiently and/or more accurately.

As illustrated in FIGS. 2B and 2C, a user interface 240, 244, may be displayed to an agent who has been assigned a contact. As illustrated in FIG. 2B, a user interface 240 may comprise displayed data associated with results of the quantum computing resource(s) processing the information associated with the contact. Such displayed data may include, as illustrated in FIG. 2B, a name of the contact, an expected language to be spoken by the contact, an expected issue or question to be addressed or raised by the contact, and/or an expected length of the call with the contact. Each datapoint may also be displayed with a degree of probability as determined by the quantum computing resource(s) 160. For example, the quantum computing resource(s) 160 may determine a probability of the name of the contact being correct or of the expected language being correct.

The user interface 240 may also comprise a list or set of questions which the quantum computing resource(s) 160 determines may be expected to be asked by the contact. The user interface 240 may include answers or links to resources where the agent viewing the user interface 240 may be enabled to view potential answers. For example, the user interface may display and/or highlight suggested and/or recommended answers and/or actions to assist the agent during the call. The user interface may also include links (e.g., URLs) to one or more knowledge bases so that the agent can provide additional information to the caller based upon the anticipated questions.

The user interface 240 may be displayed to the agent before and/or during the call with the contact. During or after the call with the contact, the agent may be presented with a displayed user interface 244 as illustrated in FIG. 2C which may enable the agent to provide feedback as to the accuracy of the predictions made by the quantum computing resource(s) 160. For example, the agent may be enabled to interact with the user interface 244 to select whether the predicted name and/or language is correct and/or whether the predicted issues and/or questions were raised or asked. Any information provided by the agent may be used for training resources such as for machine learning purposes and/or as feedback to the quantum computing resource(s) 160 to improve future predictions regarding the same customer and/or other callers.

As illustrated in FIG. 2D, a user interface 248 may be presented to the contact. For example, in the case of a contact contacting the contact center through a browser window or text messaging application, a user interface 248 as illustrated in FIG. 2D may be displayed on a display device of a user device operated by the contact. Such a user interface 248 may include information based at least in part upon the probabilistic output of the quantum computing resource(s) 160. For example, the user interface 248 may comprise a display of the caller's name (or expected name), an indication or identification of the agent assigned to the contact, a helpful instruction or answer based on an expected issue or question, a link to a resource or resources with helpful information, an expected call length based on information such as caller history and the issues and/or questions expected to be raised by the caller, and/or an expected amount of time for which the contact may be required to wait to speak with the agent. Referring now to FIG. 3, another method of operating a contact center 108 will be described in accordance with at least some embodiments of the present disclosure. The method may begin after a contact has been received in the contact center 108. Upon a contact being received in the contact center 108, the work assignment engine 156 may be configured to gather information about the contact (step 304). The information gathered about the contact may include, for example, metadata associated with the contact, metadata associated with the customer 116 having initiated the contact, metadata associated with the customer communication device 112 used to initiate the contact, or some combination thereof. The work assignment engine 156 may also be configured to gather other contact center information (step 308). Other contact center information may include, for example, contact center state information (e.g., any information describing a key performance indicator (KPI) associated with the contact center), agent status/availability information, agent workload, etc. Other types of information which may be gathered by the work assignment engine 156 may include customer-specific information (e.g., information obtained from a CRM database).

Any information gathered by the work assignment engine 156 may be provided to the quantum computing resource(s) 160 (step 312). Such information may be provided in a predetermined format which may be acceptable and ingestible by the quantum computing resource(s) 160.

Upon receiving the gathered information, the quantum computing resource(s) 160 may process the information to reduce a problem space for traditional computing resources of the contact center 108. As part of reducing the problem space, the quantum computing resource(s) 160 may generate one or more probabilistic outputs and provide the probabilistic output(s) back to the traditional computing environment of the contact center 108 (step 316). For example, the probabilistic output(s) may be provided back to the contact management server 132 for further processing by the processor 136.

The method may next include employing the traditional computing resource(s) of the contact center 108 to make a work assignment decision for the contact (step 320). In some embodiments, the traditional computing resource(s) are enabled to make an educated and optimized work assignment decision based on the probabilistic output(s) received from the quantum computing resource(s) 160. Moreover, because the quantum computing resource(s) 160 reduced the problem space by processing the information about the contact and other information gathered by work assignment engine 156, the work assignment decision can be made in a timeframe acceptable to the customer 116.

While embodiments of the present disclosure have been described in connection with processing inbound contacts (e.g., a contact center 108 handling contacts that are initiated by an entity located outside the contact center 108), it should be appreciated that embodiments of the present disclosure are not so limited. For example, embodiments of the present disclosure also contemplate that quantum computing resource(s) 160 can be used to improve operations of a contact center 108 processing outbound contacts. For example, quantum computing resource(s) 160 can be configured to provide a probabilistic output related to any anticipated responses which may be received from a customer when the customer is proactively contacted by a specific outbound marketing campaign. In this way, such probabilistic outputs can be provided to the contact management server 132 to control or maintain an order and/or timing associated with initiating communications with particular customers.

As another example of a way in which quantum computing resource(s) 160 can be used to improve contact center 108 performance, the quantum computing resource(s) 160 may be configured to reconcile the non-deterministic nature of having multiple instances of routing engines operating concurrently on a set of agents within a contact center 108. In this way, multiple routing engines (e.g., different work assignment engines 156) can be configured to cooperate more efficiently by using inputs provided by the quantum computing resource(s) 160.

In some embodiments, other aspects of contact center 108 performance may be improved with quantum computing resource(s) 160. As an example, quantum computing resource(s) 160 can be applied to workforce management (e.g., forecasting availability agents for particular shifts, anticipating performance levels of agents, improving training quality for agents, etc.). Outputs of the quantum computing resource(s) 160 can be used to determine whether and/or when certain agents are or should be assigned to certain shifts and/or queues, trained on certain skills, moved from one task to another task, etc.

There is also an emerging focus on quantum algorithms that support artificial intelligence (AI). Quantum computing resource(s) 160 can be used within the contact center 108 to support improved conversational AI operations. The same quantum computing resource(s) 160 described above as supporting routing decisions can also be used to augment AI models and training data for AI/ML solutions deployed within a contact center 108. For example, quantum computing resource(s) 160 may be utilized to improve chatbot interactions, e.g., the ability of a chatbot to provide more appropriate responses to a customer and/or more appropriate suggestions to contact center agents as part of an agent assist scenario. The quantum computing resource(s) 160 may in some embodiments receive, in real-time, inputs from conversations between a chatbot 152 and a customer. The quantum computing resource(s) 160 may be configured to provide suggested responses for the chatbot 152 which may be reviewed and/or approved by a human agent 164. The quantum computing resource(s) 160 may be configured to analyze a proposed output generated by the chatbot 152 and to provide a probabilistic output for a human agent 164 describing a likelihood of whether the chatbot's 152 response addresses a question raised by the customer. The probabilistic output generated by the quantum computing resource(s) 160 may be presented to the human agent 164 along with the chatbot's 152 proposed response to help the human agent 164 quickly determine whether to approve the chatbot's 152 proposed response.

Referring now to FIG. 4A, another method of operating a contact center 108 will be described in accordance with at least some embodiments of the present disclosure. The method illustrated in FIG. 4A may be utilized to reduce the complexity of the problems which must be solved by the traditional computing elements of a contact center to effectively handle incoming calls.

Over time, contact centers are becoming increasingly popular for resolving issues of customers. With the growth in popularity, contact centers comprise an ever-increasing number of agents. For example, a single contact center may comprise over one hundred thousand agents. The complexity involved in managing a large number of agents exponentially grows with each new agent added to the contact center.

A key goal of a contact center is to connect a customer contacting the contact center with an agent who is both available within a reasonable amount of time and is most optimal to handle the customer's issue. For example, if a customer dials a number for a contact center because of a problem with her internet, the contact center may strive to get an agent trained in internet issues in communication with the customer as soon as possible.

To meet such a goal, the contact center must determine (or predict) a caller's issues and questions, spoken language, and any other caller-related factors which may affect the decision as to which agent should speak with the caller. The contact center must also identify one or more agents who are both trained in the issue, can speak the caller's language (or expected language), meet any other caller-related factors, and are available or will soon be available.

In short, it is a goal that a contact center be capable of predicting the availability of an agent based on key performance indicators. Key performance indicators (KPIs) comprise a multi-dimensional set of attributes in a database. Attributes may include, for example, a number of work items an agent currently has in her queue, a description of any particular skills in which the agent has been trained or is known to be proficient, a proficiency level of the agent (e.g., on a scale of zero to one hundred) for each skill, an availability of the agent (i.e., an amount of time since the agent's most recent call or a current length of time of the agent's current call if the agent is currently on a call), an agent occupancy rate (a percentage of the agent's time which has been occupied with work since the beginning of the agent's current shift), a historically average amount of time for the particular agent to resolve or end a call (i.e., an average handle time for the agent), a current status of the agent (i.e., busy or available), a percentage of calls the agent has blocked, an average time in queue for work items assigned to the agent, an average abandonment rate for the agent, a service level objective (e.g., to answer 90% of calls in 30 seconds or less), an average speed of answer for the agent, an average after call work time for the agent, a first call resolution score for the agent, and/or any other performance indicators.

The contact center, to be successful, must be capable of, in a short amount of time of a customer calling, identifying one or more agents available and qualified to speak with the customer, so that the customer does not grow frustrated and/or end the communication before speaking with an agent.

As the number of agents available to the contact center grows, the processing power required to make a quick prediction grows. Traditional computers reach a performance ceiling requiring both extreme processing power and memory and long database searches. Because contact centers are growing ever increasingly large, employing a large number of agents, such as over one hundred thousand in some cases, a computer system capable of utilizing quantum computing resource(s) 160 may be required.

While traditional computers may be faster than quantum computers at solving one-dimensional problems, it has been seen that traditional computers cannot adequately solve multi-dimensional problems. Multi-dimensional problems include, for example, attribute routing or matching an agent or set of agents with a customer based on availability of the agent or agents as well as KPIs of the agent or agents. Quantum computing resources have been shown to be capable of solving multi-dimensional attribute routing faster than traditional computer systems.

The method of FIG. 4A involves utilizing quantum computing resource(s) 160 to implement an algorithm configured to select a subset of agents from a larger set of agents, such as a pool of all agents available to a particular contact center. One goal for the algorithm is to minimize the amount of time between a customer contacting the contact center and the determination as to the agents comprising the subset of agents.

In some embodiments, the subset of agents may be a list of agents which are acceptable based on contact center preferences. In some embodiments, the subset may be returned by the quantum computing resource(s) at the elapsing of a particular amount of time or may be returned by the quantum computing resource(s) upon the subset reaching a particular number of acceptable agents. The quantum computing resource(s) may also provide a score or a list of factors associated with each agent with the subset. By providing a subset of agents, the quantum computing resource(s) 160 effectively reduce the problem space for the traditional computer, enabling the contact center to route customers to optimal agents in a timely manner.

The method may begin upon a contact being received in the contact center 108 (step 404). As discussed above, a contact may comprise a caller such as a customer or other type of user calling a contact center 108, texting the contact center 108, messaging the contact center 108, or otherwise communicating with the contact center.

Next, the method may comprise collecting information associated with the contact as well as with one or more agents (step 408). Collecting information associated with the contact may comprise, for example, determining an identity based on information such as an IP address, caller ID, username, etc. Information associated with the contact may comprise, for example, a name, a phone number, a caller history, agent notes associated with past calls associated with the contact, etc.

Collecting information associated with the agents may comprise, for example, obtaining a list of agents accessible to the contact center, such as a list of all agents currently working for the contact center. The information may also comprise one or more KPIs for the agents such as discussed above. In some embodiments, the method may also comprise obtaining information relating to one or more contact center variables such as total number of active agents, details on the contact center operating environment, such as whether there is currently a surplus of agents or a surplus of work items or callers waiting, a description of any active resource selection strategies (e.g., identifying one or more least occupied agents (LOAs) and/or most idle agents (MIAs)), a description of the computation resources available to the contact center (e.g., CPU and memory statistics), etc.

Any such information relating to the contact, the agents, and the contact center may be passed from the traditional contact center computer to the quantum computing resource(s) 160 (step 412). In some embodiments, the information may be passed in an instruction to the quantum computing resource such as, "List (withinTseconds, listOfAgents(AgentID, Status, onTheRecentCall, topNAgents)," where withinTseconds is a timeframe in which an answer is required, ListOfAgents is an array comprising entries for each agent, AgentID is a number or string representing a particular agent or group of agents, status represents the current status of the particular agent or group of agents (e.g., offline, idle, on a call with a colleague, on a call with a supervisor, on a call with a customer), onTheRecentCall is a number of seconds representing a duration of a most recent or a current call for the particular agent. In some embodiments, additional information may be included, such as a deviation from the typical call length (e.g., CallLength=OnTheCurrentCall/timeOnTheShift (positive or negative, meaning shorter or longer than personal average), an agent availability score (e.g., idle_in_seconds/total_time since beginning of the shift), etc.

After the quantum computing resource(s) 160 receive the information, the quantum computing resource(s) may process the information (step 416). Processing the information may comprise, for example, choosing, among the complete list of agents, the most probable agents which should be available within a particular amount of time, (e.g., five seconds). In effect, the quantum computing resource(s) may be configured to select, from a complete list of agents, a short list or subset of agents that meet the requirements, i.e., fit the profile, and to returns the list or subset to the traditional contact center computer for processing.

Upon the quantum computing resource(s) 160 returning the list of agents, the traditional contact center computer may receive the list of agents (step 420). In some embodiments, the traditional contact center computer may be configured to determine which agent of the list received from the quantum computing resource(s) 160 possesses the most optimal combination of skills, assets, and availability. The traditional contact center computer may further be configured to select a score for each of the agents on the list generated by the quantum computing resource(s) 160. It should also be appreciated that in some embodiments the quantum computing resource(s) 160 may be configured to determine such information as opposed to relying upon the traditional computing elements of the contact center.

While the embodiments described herein relate generally to selecting an available and most optimal contact center agent, it should be appreciated the same or similar systems and methods may be implemented to select between using a human agent or an automated agent or chatbot based on the response from the quantum computing resource(s) 160. For example, the quantum computing resource(s) 160 may be configured to determine whether, based on the issues and/or questions predicted to be raised by the customer, a human or an automated agent should handle the call. In some embodiments, the determination as to whether a human or an automated agent should handle the call may be made based in part on the availability of human agents to handle the call. For example, if all or a large majority of agents for the call center are currently on calls, the quantum computing resource(s) 160 may be more likely to recommend or assign a chatbot or automated agent to handle the call.

As illustrated in FIG. 4A, the method may comprise determining whether the contact should be automatically routed based on the optimally selected agent or whether a manual decision may be required (step 424). For example, a user such as an administrator of the contact center may be enabled to select between an auto-routing feature in which contacts are automatically assigned a most optimal and available agent or whether a user such as a manager of the contact center should be presented with details as to the assignments and to make the decision manually.

If the auto-routing feature is selected, the method may comprise connecting the caller with the agent as discussed above automatically (step 428). If the auto-routing feature is not selected, the method may comprise generating a user interface 440 such as illustrated in FIG. 4B and displaying the user interface 440 on a user device operated by a manager of the contact center for decision making (step 432).

As illustrated in the user interface 440 of FIG. 4B, a user interface 440 may comprise indications of information determined about the contact such as those discussed above in relation to FIGS. 2A-2C. The user interface 440 may also comprise a list of the agents comprised within the short list or subset of agents generated by the quantum computing resource(s) 160 as described above. Such a list may include an indication as to which agent is the most optimal or is otherwise suggested. The list may include a score such as a percentage indicating a level of optimality for each agent. The user interface 440 may include, for each agent in the list, an explanation of the factors involved in making the determination, such as skill proficiencies, language requirements, and availability.

The user, such as a manager, may be enabled, through interacting with hyperlinks provided in the user interface 440 for example, to select between the agents, to select a suggested or most optimal agent, or to override the suggestion and to manually select an agent.

Finally, upon an agent being selected—either automatically or manually—the contact may be connected to the agent (step 436). As discussed above, when an agent is selected for communicating with the contact, the agent may be presented with a user interface such as that illustrated in FIG. 2B, and the contact may be presented with a user interface such as illustrated in FIG. 2D as discussed above. Embodiments of the present disclosure include a method of routing communications, the method comprising: receiving, by a processor of a first computing system, a communication associated with a contact; transmitting information associated with the communication to a second computing system comprising a quantum computing resource; receiving a probabilistic output from the second computing system, wherein the probabilistic output is generated by the second computing system based on the quantum computing resource processing the information associated with the communication; and utilizing the probabilistic output received from the second computing system to assign a contact center resource to the contact.

Aspects of the above method include wherein the contact center resource comprises at least one of a human agent and an automated agent.

Aspects of the above method include wherein the information associated with the communication comprises an identifier associated with at least one of a customer communication device and a user of the customer communication device.

Aspects of the above method include wherein the information associated with the communication comprises at least one of a phone number, email address, Instant Messaging (IM) address, and username.

Aspects of the above method include wherein the probabilistic output comprises a data set describing a plurality of possible topics associated with the contact.

Aspects of the above method include wherein the data set comprises a probability associated with each of the plurality of possible topics.

Aspects of the above method include wherein the probabilistic output comprises a data set describing a plurality of possible language requirements associated with the contact along with a probability associated with each of the plurality of possible language requirements.

Aspects of the above method include wherein the probabilistic output comprises a data set describing a plurality of possible skill requirements associated with a need of the contact along with a probability associated with each of the plurality of possible skill requirements.

Aspects of the above method include wherein the plurality of possible skill requirements comprises a requirement for at least one of a language skill, a technical skill, and a human interactive skill.

Aspects of the above method include wherein the probabilistic output comprises a plurality of possible outcomes predicted by the quantum computing resource.

Aspects of the above method include wherein utilizing the probabilistic output received from the second computing system to assign a contact center resource to the contact comprises using a traditional computing resource to process the probabilistic output and determine an optimal contact center resource to assign to the contact for each possible outcome predicted by the quantum computing resource.

Aspects of the above method include wherein the first computing system comprises at least one of a Central Processing Unit (CPU), a Graphics Processing Unit (GPU), and a Data Processing Unit (DPU).

Aspects of the above method include wherein the probabilistic output comprises a most likely question to be posed by the contact and wherein the method comprises generating an answer to the most likely question to be posed by the contact.

Aspects of the above method include wherein the answer is generated in a language determined to be most likely to be understood by the customer.

Aspects of the above method include wherein the answer is provided to a contact center agent prior to sharing the answer with the customer.

Aspects of the above method include wherein the probabilistic output comprises a second candidate answer to the most likely question to be posed by the customer, wherein the probabilistic output identifies a first probability associated with the answer satisfying the most likely question to be posed by the customer, and wherein the probabilistic output identifies a second probability associated with the second candidate answer satisfying the most likely question to be posed by the customer.

Aspects of the above method include the method further comprising training an Artificial Intelligence model based on the probabilistic output.

Embodiments include a first computing system comprising: a processor; and a computer-readable storage medium storing computer-readable instructions which, when executed by the processor, cause the processor to execute a method, the method comprising: receiving a communication associated with a contact; transmitting information associated with the communication to a second computing system comprising a quantum computing resource; receiving a probabilistic output from the second computing system, wherein the probabilistic output is generated by the second computing system based on the quantum computing resource processing the information associated with the communication; and utilizing the probabilistic output received from the second computing system to assign a contact center resource to the contact.

Aspects of the above computing system include wherein the contact center resource comprises at least one of a human agent and an automated agent.

Aspects of the above computing system include wherein the information associated with the communication comprises an identifier associated with at least one of a customer communication device and a user of the customer communication device.

Aspects of the above computing system include wherein the information associated with the communication comprises at least one of a phone number, email address, Instant Messaging (IM) address, and username.

Aspects of the above computing system include wherein the probabilistic output comprises a data set describing a plurality of possible topics associated with the contact.

Aspects of the above computing system include wherein the data set comprises a probability associated with each of the plurality of possible topics.

Aspects of the above computing system include wherein the probabilistic output comprises a data set describing a plurality of possible language requirements associated with the contact along with a probability associated with each of the plurality of possible language requirements.

Aspects of the above computing system include wherein the probabilistic output comprises a data set describing a plurality of possible skill requirements associated with a need of the contact along with a probability associated with each of the plurality of possible skill requirements.

Aspects of the above computing system include wherein the plurality of possible skill requirements comprises a requirement for at least one of a language skill, a technical skill, and a human interactive skill.

Aspects of the above computing system include wherein the probabilistic output comprises a plurality of possible outcomes predicted by the quantum computing resource.

Aspects of the above computing system include wherein utilizing the probabilistic output received from the second computing system to assign a contact center resource to the contact comprises using a traditional computing resource to process the probabilistic output and determine an optimal contact center resource to assign to the contact for each possible outcome predicted by the quantum computing resource.

Aspects of the above computing system include wherein the first computing system comprises at least one of a Central Processing Unit (CPU), a Graphics Processing Unit (GPU), and a Data Processing Unit (DPU).

Aspects of the above computing system include wherein the probabilistic output comprises a most likely question to be posed by the contact and wherein the method comprises generating an answer to the most likely question to be posed by the contact.

Aspects of the above computing system include wherein the answer is generated in a language determined to be most likely to be understood by the customer.

Aspects of the above computing system include wherein the answer is provided to a contact center agent prior to sharing the answer with the customer.

Aspects of the above computing system include wherein the probabilistic output comprises a second candidate answer to the most likely question to be posed by the customer, wherein the probabilistic output identifies a first probability associated with the answer satisfying the most likely question to be posed by the customer, and wherein the probabilistic output identifies a second probability associated with the second candidate answer satisfying the most likely question to be posed by the customer.

Aspects of the above computing system include the method further comprising training an Artificial Intelligence model based on the probabilistic output.

Embodiments include a computer program product comprising: a non-transitory computer-readable storage medium having computer-readable program code embodied therewith, the computer-readable program code configured, when executed by a processor, to execute a method, the method comprising: receiving a communication associated with a contact; transmitting information associated with the communication to a second computing system comprising a quantum computing resource; receiving a probabilistic output from the second computing system, wherein the probabilistic output is generated by the second computing system based on the quantum computing resource processing the information associated with the communication; and utilizing the probabilistic output received from the second computing system to assign a contact center resource to the contact.

Aspects of the above computer program product include wherein the contact center resource comprises at least one of a human agent and an automated agent.

Aspects of the above computer program product include wherein the information associated with the communication comprises an identifier associated with at least one of a customer communication device and a user of the customer communication device.

Aspects of the above computer program product include wherein the information associated with the communication comprises at least one of a phone number, email address, Instant Messaging (IM) address, and username.

Aspects of the above computer program product include wherein the probabilistic output comprises a data set describing a plurality of possible topics associated with the contact.

Aspects of the above computer program product include wherein the data set comprises a probability associated with each of the plurality of possible topics.

Aspects of the above computer program product include wherein the probabilistic output comprises a data set describing a plurality of possible language requirements associated with the contact along with a probability associated with each of the plurality of possible language requirements.

Aspects of the above computer program product include wherein the probabilistic output comprises a data set describing a plurality of possible skill requirements associated with a need of the contact along with a probability associated with each of the plurality of possible skill requirements.

Aspects of the above computer program product include wherein the plurality of possible skill requirements comprises a requirement for at least one of a language skill, a technical skill, and a human interactive skill.

Aspects of the above computer program product include wherein the probabilistic output comprises a plurality of possible outcomes predicted by the quantum computing resource.

Aspects of the above computer program product include wherein utilizing the probabilistic output received from the second computing system to assign a contact center resource to the contact comprises using a traditional computing resource to process the probabilistic output and determine an optimal contact center resource to assign to the contact for each possible outcome predicted by the quantum computing resource.

Aspects of the above computer program product include wherein the first computing system comprises at least one of a Central Processing Unit (CPU), a Graphics Processing Unit (GPU), and a Data Processing Unit (DPU).

Aspects of the above computer program product include wherein the probabilistic output comprises a most likely question to be posed by the contact and wherein the method comprises generating an answer to the most likely question to be posed by the contact.

Aspects of the above computer program product include wherein the answer is generated in a language determined to be most likely to be understood by the customer.

Aspects of the above computer program product include wherein the answer is provided to a contact center agent prior to sharing the answer with the customer.

Aspects of the above computer program product include wherein the probabilistic output comprises a second candidate answer to the most likely question to be posed by the customer, wherein the probabilistic output identifies a first probability associated with the answer satisfying the most likely question to be posed by the customer, and wherein the probabilistic output identifies a second probability associated with the second candidate answer satisfying the most likely question to be posed by the customer.

Aspects of the above computer program product include the method further comprising training an Artificial Intelligence model based on the probabilistic output.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether such alternate, interchangeable and/or equivalent structures, functions, ranges or steps are disclosed herein, and without intending to publicly dedicate any patentable subject matter.

What is claimed is:

1. A method of routing communications, the method comprising:
   receiving, by a processor of a first computing system, a communication associated with a contact;
   transmitting information associated with the communication to a second computing system comprising a quantum computing resource;
   receiving a probabilistic output from the second computing system, wherein the probabilistic output is generated by the second computing system based on the quantum computing resource processing the transmitted information associated with the communication; and
   automatically assigning a contact center resource to the contact based at least in part on the probabilistic output received from the second computing system.

2. The method of claim 1, wherein the contact center resource comprises at least one of a human agent and an automated agent.

3. The method of claim 1, wherein the transmitted information associated with the communication comprises an identifier associated with at least one of a customer communication device and a user of the customer communication device.

4. The method of claim 1, wherein the transmitted information associated with the communication comprises at least one of a phone number, email address, Instant Messaging (IM) address, and username.

5. The method of claim 1, wherein the probabilistic output comprises a data set describing a plurality of possible topics associated with the contact.

6. The method of claim 5, wherein the data set comprises a probability associated with each of the plurality of possible topics.

7. The method of claim 1, wherein the probabilistic output comprises a data set describing a plurality of possible language requirements associated with the contact along with a probability associated with each of the plurality of possible language requirements.

8. The method of claim 1, wherein the probabilistic output comprises a data set describing a plurality of possible skill requirements associated with a need of the contact along with a probability associated with each of the plurality of possible skill requirements.

9. The method of claim 8, wherein the plurality of possible skill requirements comprises a requirement for at least one of a language skill, a technical skill, and a human interactive skill.

10. The method of claim 1, wherein the probabilistic output comprises a plurality of possible outcomes predicted by the quantum computing resource.

11. The method of claim 10, wherein utilizing the probabilistic output received from the second computing system to assign a contact center resource to the contact comprises using a traditional computing resource to process the probabilistic output and determine an optimal contact center resource to assign to the contact for each possible outcome predicted by the quantum computing resource.

12. The method of claim 1, wherein the second computing system comprises quantum computing resources configured to be deployed as a single physical system or as a network of quantum computing resources.

13. The method of claim 1, wherein the probabilistic output comprises a most likely question to be posed by the contact and wherein the method comprises generating an answer to the most likely question to be posed by the contact.

14. The method of claim 13, wherein the answer is generated in a language determined to be most likely to be understood by a customer.

15. The method of claim 14, wherein the answer is provided to a contact center agent prior to sharing the answer with the customer.

16. The method of claim 13, wherein the probabilistic output comprises a second candidate answer to the most likely question to be posed by the customer, wherein the probabilistic output identifies a first probability associated with the answer satisfying the most likely question to be posed by the customer, and wherein the probabilistic output identifies a second probability associated with the second candidate answer satisfying the most likely question to be posed by the customer.

17. The method of claim 1, further comprising training an Artificial Intelligence model based on the probabilistic output.

18. The method of claim 1, wherein the contact center resource is a first agent of a plurality of agents within a contact center, wherein a plurality of routing engines cooperate based on the probabilistic output from the second computing system.

19. A first computing system comprising:
   a processor; and
   a computer-readable storage medium storing computer-readable instructions which, when executed by the processor, cause the processor to execute a method, the method comprising:
      receiving a communication associated with a contact;
      transmitting information associated with the communication to a second computing system comprising a quantum computing resource;
      receiving a probabilistic output from the second computing system, wherein the probabilistic output is generated by the second computing system based on the quantum computing resource processing the transmitted information associated with the communication; and
      automatically assigning a contact center resource to the contact based at least in part on the probabilistic output received from the second computing system.

20. A computer program product comprising:
   a non-transitory computer-readable storage medium having computer-readable program code embodied therewith, the computer-readable program code configured, when executed by a processor, to execute a method, the method comprising:

receiving a communication associated with a contact;

transmitting information associated with the communication to a second computing system comprising a quantum computing resource;

receiving a probabilistic output from the second computing system, wherein the probabilistic output is generated by the second computing system based on the quantum computing resource processing the transmitted information associated with the communication; and automatically assigning a contact center resource to the contact based at least in part on the probabilistic output received from the second computing system.

* * * * *